United States Patent
Amemiya

(10) Patent No.: US 7,154,386 B2
(45) Date of Patent: Dec. 26, 2006

(54) SAFETY DEVICE FOR USE WITH VEHICLES FOR FORCING WEARING OF SEATBELTS BY A DRIVER AND PASSENGERS

(76) Inventor: Akira Amemiya, 15 Lucille Ct., Piscataway, NJ (US) 08854-2865

( * ) Notice: Subject to any disclaimer, the term of this patent is extended or adjusted under 35 U.S.C. 154(b) by 151 days.

(21) Appl. No.: 11/073,258

(22) Filed: Mar. 4, 2005

(65) Prior Publication Data

US 2005/0200466 A1   Sep. 15, 2005

(30) Foreign Application Priority Data

Mar. 4, 2004   (JP)   .............................. 2004-109498

(51) Int. Cl.
*B60Q 1/00*   (2006.01)

(52) U.S. Cl. ................. 340/457.1; 701/30; 340/425.5; 340/438; 340/457

(58) Field of Classification Search ............... 340/457, 340/457.1, 438, 439, 425.5; 180/271, 272; 701/30
See application file for complete search history.

(56) References Cited

U.S. PATENT DOCUMENTS

| | | | | |
|---|---|---|---|---|
| 3,787,804 A | * | 1/1974 | MacDonald | 180/268 |
| 3,898,473 A | * | 8/1975 | Ueda et al. | 180/270 |
| 3,906,441 A | * | 9/1975 | Andersen et al. | 340/457.1 |
| 6,215,395 B1 | * | 4/2001 | Slaughter et al. | 340/457.1 |
| 6,556,903 B1 | * | 4/2003 | Chinigo et al. | 701/29 |
| 6,977,582 B1 | * | 12/2005 | Ota et al. | 340/457.1 |
| 6,992,571 B1 | * | 1/2006 | Ota et al. | 340/407.1 |

* cited by examiner

*Primary Examiner*—Jeffery Hofsass
*Assistant Examiner*—Hoi C. Lau
(74) *Attorney, Agent, or Firm*—Pitney Hardin LLP

(57) ABSTRACT

A safety device for use with vehicles is disclosed for forcing the wearing of seatbelts by both a driver and a passenger which may eliminate the unpleasant situation that passengers seat sensors, passenger seatbelt switch and its associated alarm operate separately or independently of the presence or absence of a driver sitting on a driver sheet.

5 Claims, 1 Drawing Sheet

SAFETY DEVICE FOR USE WITH VEHICLES FOR FORCING WEARING OF SEATBELTS BY A DRIVER AND PASSENGERS

FIELD OF THE INVENTION

This invention relates to a safety device for use with vehicles for forcing wearing of seatbelts by both a driver and passengers, and more particularly relates to a safety device for assuring safety of lives of a driver and passengers by forcing wearing of seatbelts.

BACKGROUND OF THE INVENTION

It is well known from many actual car accidents and experimental data that wearing of seatbelts is very effective for assuring safety of drivers and passengers. For this reason the wearing of seatbelts is nowadays mandatory and the persons who fail to comply the seatbelt law are subject to penalty provisions.

However, drivers and passengers often fail or forget to wear the seatbelt mainly because of limits in freedom of their upper bodies or restrained from or troublesome operations. As a consequence, the drivers and passengers not only subject to penalties but also experience unforeseen situations with their lives when they are involved in a car accident. Any measures are needed for assuring that all drivers and passengers wear the seatbelts. It is possible to install such safety measures during design or manufacturing of vehicles. However, it is not so easy to install such safety measures in the vehicles that are already in use by consumers.

U.S. Pat. Nos. 6,215,395 and 3,693,147 show such safety devices which include a plurality of seat sensors and a plurality of seatbelt switches to activate a visual or voice alarm or stop the engine from running for forcing wearing of seatbelts by a driver and a passenger. However, the individual seat sensors and seatbelt switches in the safety devices shown by those references work separately or independently so that alarm lamps are blinking or voice alarms are generating separately or independently even if no driver sits on the driver seat and the vehicle is not ready for driving.

SUMMARY OF THE INVENTION

Accordingly, it is an object of the present invention to provide a safety device which may eliminate the above mentioned problem.

It is another object of the present invention to provide a safety device for forcing the wearing of seatbelts by both a driver and a passenger which may eliminate the unpleasant situation that passengers seat sensors, passenger seatbelt switch and its associated alarm operate separately or independently of the presence or absence of a driver sitting on a driver sheet.

To accomplish these objects, the present invention provides a safety device for use with vehicles, forcing the wearing of seatbelts by both a driver and passengers, comprising a power source for energizing an engine of the vehicle; a relay for connecting and disconnecting the power source; a first seat sensor responsive to the pressure of a driver sitting on a driver seat; a second seat sensor responsive to the pressure of a passenger sitting on a passenger seat; a first seatbelt switch responsive when a driver's seatbelt is not in use or indicated to be not in use, said first seatbelt switch being connected in series with said first seat sensor and the series connection of the first seatbelt switch and the first seat sensor being connected to the relay, a first alarm connected to the series connection of the first seatbelt switch and the first seat sensor for providing an alarm to the driver when the driver's seatbelt is not in use or indicated to be not in use, a second seatbelt switch responsive when a passenger's seatbelt is not in use or indicated to be not in use, said second seatbelt switch being connected in series with said second seat sensor and the series connection of the first seatbelt switch and the first seat sensor being connected to the relay, a second alarm connected to the series connection of the second seatbelt switch and the second seat sensor for providing an alarm to the passenger when the passenger's seatbelt is not in use or indicated to be not in use, wherein the second seatbelt switch is connected to the joint between the first seat sensor and the first seatbelt switch to interpose the second seat sensor and the first seat sensor in series between the relay and the engine whereby the safety device is disabled and the second alarm is prohibited from providing an alarm to the passenger unless the driver sits on the driver seat.

With the above arrangements of the safety device embodying the present invention, the alarm lamps will blink to provide alarm twice or three times for prompting the driver or passengers to wear seatbelts when each of the seat sensor affirms that the seat is occupied. At the same time, the main relay is activated to disconnect the engine starter circuit in order to prevent the engine from starting. Once the seatbelt is in use the engine start circuit is placed in operating condition to permit the engine to start working. The driver seat sensor governs the alarm operation for the passengers so that the passenger's alarm will not be enabled unless the driver sits on the driver seat and the vehicle is ready for driving. In addition, the burglar circuit may be placed under operating condition if the driver turns on a security switch and gets out of the vehicle.

DETAILED DESCRIPTION OF THE INVENTION

Figure 1:
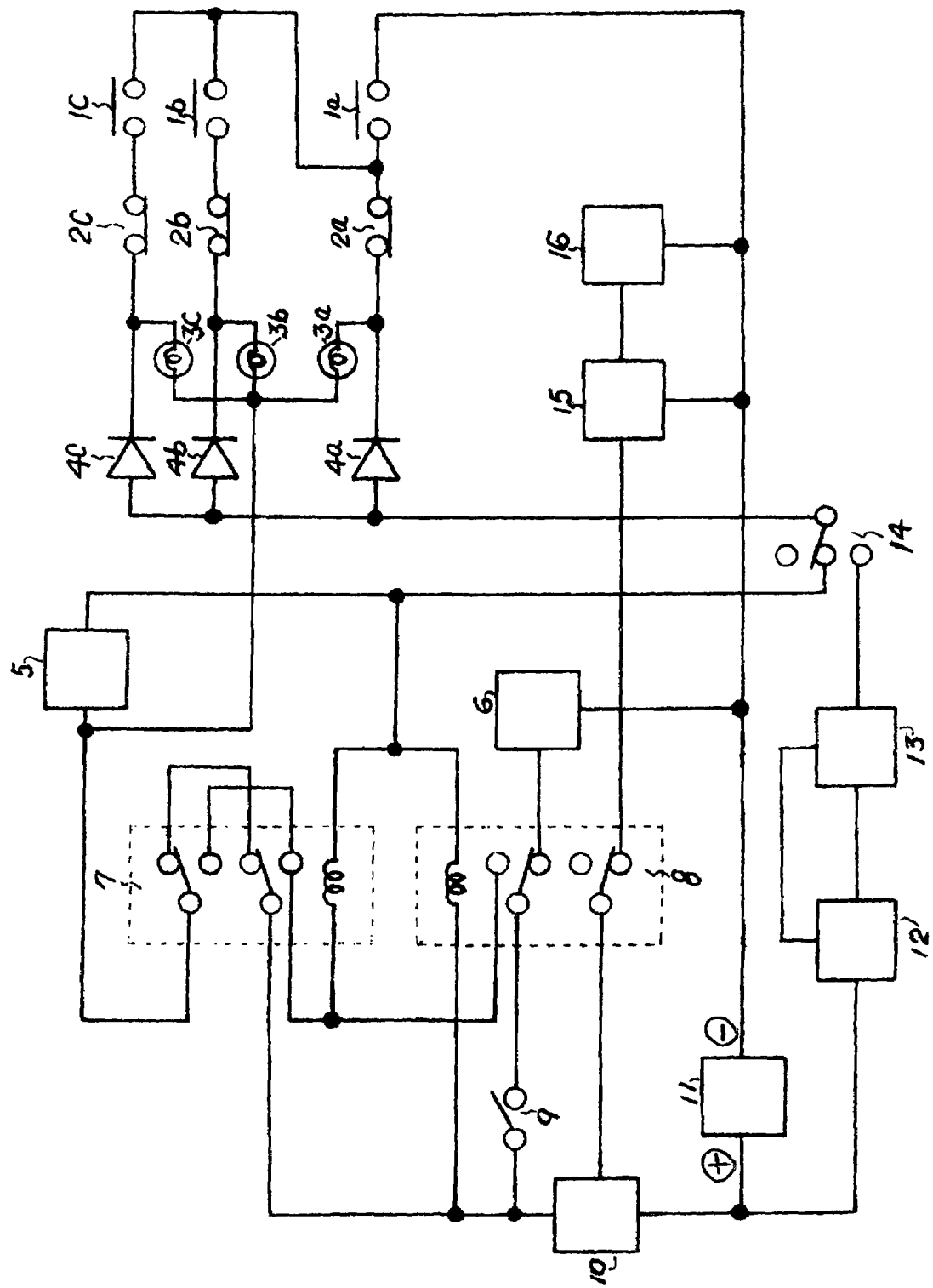
FIG. 1 is a block diagram showing a safety device according to an embodiment of the present invention.

Referring to FIG. 1, there is illustrated a safety device according to an embodiment of the present invention. There are provided a driver seat sensor 1a, normally open, pressure switch which is closed by the pressure of a driver sitting on the driver seat.

Preferably, there are further provided a front seat passenger seat sensor 1b, that is, normally open pressure switch which is operated or closed by the pressure of a front seat passenger sitting on the front passenger seat and back seat passenger seat sensors 1c, and back seat passenger seat sensors 1c of the same type as the driver seat sensor 1a and the front seat passenger seat sensor 1b.

There are also provided a seatbelt switch 2a for the driver seat, a seatbelt switch 2b for the front passenger seat, and a seatbelt switch 2c for the back passenger seat, all of which are open when the corresponding safety belt is not in use and closed when the corresponding safety belt is indicated to be in use. It is noted from FIG. 1 that the seat belt switches 2a, 2b and 2c are respectively connected in series with the corresponding seat sensors 1a, 1b and 1c. Alarm lamps 3a, 3b and 3c are respectively connected to the corresponding seatbelt switches 2a, 2b and 2c to provide a visual alarm for prompting the driver and passengers to wear the seatbelts.

A battery 11 are shown with to energize an engine 16, with its plus side connected to an ignition switch 10, a main relay 8 and an engine starter circuit 15, and its minus side connected directly to the engine 16. In general, the engine 16 is energized only when the driver sits on the driver seat as confirmed by the seat sensor 1a and the seatbelt is in use as confirmed by the seatbelt switch 2a. Otherwise, the engine 16 is not energized through operation of the main relay 8.

A voice generator 5 is connected to the alarm lamps 3a, 3b and 3c to provide a voice alarm, for example, human synthesized voice "fasten seatbelt" three times under certain conditions as discussed below. The voice generator 5 is activated through a voice relay 7 connected to the battery 11. Another couple of terminals of the main relay 8 is connected between a brake switch 9 and a shift lock circuit 6 via a voice relay 7.

In addition, a burglar alarm buzzer 12 and a burglar alarm buzzer delay relay 13 and a three-position security switch 14 are also connected in association with the safety device as discussed above. If the security switch 14 is held on and the driver left the vehicle, the burglar alarm buzzer 12 is placed into operative status. In the circuit arrangement of FIG. 1, reverse flow blocking diodes 4a, 4b and 4c are further respectively connected in series with the corresponding seatbelt switches 2a, 2b and 2c and the seat sensors 1a, 1b and 1c.

To give an overview of the basic feature of the safety device, it is assumed now that the circuit arrangement of FIG. 1 does include the seat sensor 1a, the seatbelt switch 2a and the alarm lamp 3a only (and without the seat sensors 1b and 1c and the seatbelt switches 2b and 2c). If the seat sensor 1a is closed or ON but the seatbelt switch 2a is still closed (not in use) and the driver turns on the ignition switch 10, then the main relay 8 is activated through a circuit loop running from the plus side of the battery 11, through the ignition switch 10, a coil in the main relay 8, the security switch 14, the reverse flow blocking diode 4a, the seatbelt switch 2a and the seat sensor 1a, and ending with the minus side of the battery 11. When the seatbelt switch 2a turns to the open position by wearing the seatbelt under those circumstances, the main relay 8 is deactivated so that there is established a closed loop including the engine starter circuit 15, the engine 16, the ignition switch 10 and the battery 11 to thereby start the engine to run.

In the illustrated embodiment of FIG. 1, however, there are further provided the front passenger seat sensor 1b and the back seat passenger seat sensors 1c together with the corresponding seatbelt switches 2b and 2c. The front passenger sensor 1b and the back seat passenger seat sensor 1c are connected in parallel with the driver seat sensor 1a together with the corresponding seatbelt switches 2b and 2c. It should be noted that the front passenger seat sensor 1b and the back passenger seat sensor 1c are connected to the joint between the driver seat sensor 1a and the seatbelt switch 2a so that the respective series circuits of the passengers seat sensors 1b and 1c and the seatbelt switches 2b and 2c are not enabled unless the driver seat sensor 1a is turned on.

In addition, there are further provided alarm lamps 3a, 3b and 3c and reverse flow blocking diodes 4a, 4b and 4c individual ones of which are connected in the series circuits of the seat sensors 1a, 1b and 1c and the seatbelt switches 2a, 2b and 2c.

The respective series circuits of the seat sensors 1a, 1b and 1c and the seatbelt switches 2a, 2b and 2c are connected to a minus side of the battery 11 while the burglar alarm buzzer 12, the burglar alarm buzzer delay relay 13 and the three-position security switch 14 are connected to a plus side of the battery 11.

Assume now that the front and back passenger seats are occupied by front seat and back seat passengers while the driver seat is not occupied by the driver. Under this condition, the sensors 1b and 1c are not connected to the minus side of the battery 11 so that neither the alarm lamps 3a, 3b and 3c nor the voice generator 5 are activated. Therefore, this arrangement eliminates the unpleasant situation that the alarm lamps are blinking or voice alarm is generating to force the passengers to wear the seatbelts while the vehicle is or stays at a stop without the driver seating and the vehicle is not ready to run.

Once the driver seat has been occupied by the driver, the seat sensor 1a will become activated to place the whole assembly to working condition by placing the minus side of the battery 11 in closed condition. This is one of features of the present invention.

The reverse flow blocking diodes 4a, 4b and 4c of low cost are connected to prevent the individual alarm lamps 3a, 3b and 3c from blinking at the seats different from the corresponding seats due to reverse flow on the minus side of the battery 11. This is another feature of the present invention.

When the security switch 14 is turned off as shown in FIG. 1 for repair, maintenance, parking, car washing, oil change or the like, the main relay 8, the voice relay 7, the voice generator 5 are disconnected from the minus side of the battery 11 in order to place the safety device in disabled status and the vehicle into normal condition. If the security switch 14 is turned on, then the burglar alarm delay relay 13 is connected to the minus side of the battery 11 to thereby place the safety device into burglar alert condition In the event that the driver seat is occupied by a person under burglar alert condition, the alarm buzzer 12 is activated.

When the security switch 14 is turned to its neutral position, the safety device will be placed into working condition. This is another feature of the present invention. If any one of the seatbelts is not in use, then the main relay 8 is activated to disconnect the engine starter 15 and prevent the engine 16 from running. At this time the shift lock circuit 6 is also disconnected. The main relay 8 will not be deactivated unless all of the driver and the passengers wear the seatbelts. The safety feature is implemented with an electromagnetic relay of low cost and simple structure without relying on complicated and expensive decision making arrangements.

Assume now that the engine already started with an air conditioner or heater on and the front seat and back seat passengers are seated. Since under this condition the driver seat is not occupied by the driver, the vehicle is not ready for driving and wearing of the seatbelts is not necessary. Therefore, neither visual alarm or voice alarm is provided. If the driver sits on the driver seat under these circumstances, then the seat sensor 1a is switched on so that the other seat sensors 1b and 1c are connected to the minus side of the battery 11 and the alarm lamps 3a, 3b and 3c are blinking and the voice generator 5 is providing a synthesized voice alarm "Fasten Seatbelt" three times. Even if the driver tries to start driving by stepping a brake switch 9 and shifting the transmission to the drive gear under these circumstances, the shift lock 6 will not be released to prevent the vehicle from running.

If the driver steps on the brake switch 9 again under these circumstances, then the voice relay 7 is activated to provide an alarm by the voice generator 5. Where the relay 7 is activated by a signal from the brake switch 9 upon stepping for the first time, a short circuit is connected on the plus side of the battery 11 in order to keep the relay 7 under activated condition but eliminate the unpleasant situation that a voice alarm is provided each time the driver steps on the brake switch 9. This feature is also implemented with an electromagnetic relay of low cost and simple structure to assure that the seatbelts are worn by all the driver and passengers.

As described above, the illustrated safety device comprises a plurality of the seat sensors responsive to the pressure of an occupant sitting on the seat, a plurality of the seatbelt switches responsive when the corresponding seatbelt is not in use or indicated to be not in use, the alarm lamps, the reverse flow blocking diodes, the voice generator, the main relay for energizing the engine starter circuit and the shift lock circuit, and the voice relay for energizing the voice generator. Preferably, the illustrated safety device further comprises the security switch and the burglar alarm buzzer delay relay, for providing burglar alarm feature in addition to the safety driving feature. When the seatbelts are unbuckled, the blinking lamps and voice alarms prompt both the driver and passengers to wear the seatbelts and at the same time the engine is prevented from start running. As a result, driving safety is assured by forcing the wearing of the seatbelts by both the driver and passengers.

Furthermore, the illustrated safety device may reduce risk of burglary by providing an alarm when an unauthorized person sits in the seat because the device further includes the security switch and the burglar buzzer delay relay.

It is obvious from those skilled in the art that the illustrated safety device may be pre-installed during the manufacturing or assembling of vehicles and as add-on attachments to the existing vehicles after sales.

Various other modifications and variations will no doubt occur to those skilled in the arts to which this invention pertains. Such variations and modifications, which generally rely on the teachings through which this disclosure has advanced the art, are properly considered within the scope of this invention. This disclosure should thus be considered illustrative, not limiting; the scope of the invention is instead defined by the following claims.

What is claimed is:

1. A safety device for use with a vehicle for forcing wearing of seatbelts by both a driver and a passenger, comprising:
   a power source for energizing an engine of the vehicle;
   a relay for connecting and disconnecting the power source;
   a first seat sensor responsive to the pressure of a driver sitting on a driver seat;
   a second seat sensor responsive to the pressure of a passenger sitting on a passenger seat;
   a first seatbelt switch responsive when a driver's seatbelt is not in use or indicated to be not in use, said first seatbelt switch being connected in series with said first seat sensor and the series connection of the first seatbelt switch and the first seat sensor being connected to the relay;
   a first alarm connected to the series connection of the first seatbelt switch and the first seat sensor for providing an alarm to the driver when the driver's seatbelt is not in use or indicated to be not in use;
   a second seatbelt switch responsive when a passenger's seatbelt is not in use or indicated to be not in use, said second seatbelt switch being connected in series with said second seat sensor and the series connection of the first seatbelt switch and the first seat sensor being connected to the relay;
   a second alarm connected to the series connection of the second seatbelt switch and the second seat sensor for providing an alarm to the passenger when the passenger's seatbelt is not in use or indicated to be not in use;
   wherein the second seatbelt switch is connected to the joint between the first seat sensor and the first seatbelt switch to interpose the second seat sensor and the first seat sensor in series between the relay and the engine whereby the safety device is disabled and the second alarm is prohibited from providing an alarm to the passenger unless the driver sits on the driver seat.

2. A safety device for use with a vehicle for forcing wearing of seatbelts by both a driver and a passenger, comprising:
   a power source for energizing an engine of the vehicle;
   a relay for connecting and disconnecting the engine from the power source;
   a first seat sensor responsive to the pressure of a driver sitting on a driver seat;
   a second seat sensor responsive to the pressure of a front seat passenger sitting on a front passenger seat;
   a third seat sensor responsive to the pressure of a passenger sitting on a back passenger seat;
   a first seatbelt switch responsive when a driver's seatbelt is not in use or indicated to be not in use, said first seatbelt switch being connected in series with said first seat sensor and the series connection of the first seatbelt switch and the first seat sensor being connected to the relay;
   a first alarm connected to the series connection of the first seatbelt switch and the first seat sensor for providing an alarm to the driver when the driver's seatbelt is not in use or indicated to be not in use;
   a second seatbelt switch responsive when a front passenger's seatbelt is not in use or indicated to be not in use, said second seatbelt switch being connected in series with said second seat sensor and the series connection of the second seatbelt switch and the second seat sensor being connected to the relay;
   a second alarm connected to the series connection of the second seatbelt switch and the second seat sensor for providing an alarm to the front passenger when the front passenger's seatbelt is not in use or indicated to be not in use;
   a third seatbelt switch responsive when a back passenger's seatbelt is not in use or indicated to be not in use, said third seatbelt switch being connected in series with said third seat sensor and the series connection of the third seatbelt switch and the third seat sensor being connected to the relay;
   a third alarm connected to the series connection of the third seatbelt switch and the third seat sensor for providing an alarm to the back passenger when the back passenger's seatbelt is not in use or indicated to be not in use;
   wherein the second seatbelt switch is connected to the joint between the first seat sensor and the first seatbelt switch to interpose the second seat sensor and the first seat sensor in series between the relay and the engine whereby the safety device is disabled and the second and third alarms are prohibited from providing an alarm to the front and back seat passengers unless the driver sits on the driver seat.

3. The safety device of claim 1 further comprising a first reverse flow blocking diode connected to the series connection of the first seat sensor and the first seatbelt switch and a second reverse flow blocking diode connected to the series connection of the second seat sensor and the second seatbelt switch for preventing interference between the two series connections of the first and second sensors and seatbelt switches.

4. The safety device of claim 1 further comprising a voice generator connected to the two series connections for providing a voice alarm to the driver and passenger.

5. The safety device of claim 1 further comprising a security switch having three positions wherein the first position is idle, the second position is connected to the series connections of the first and second sensors and seatbelt switches and the third position is connected to a burglar alarm.

* * * * *